(12) United States Patent
Suzuki et al.

(10) Patent No.: US 11,422,544 B2
(45) Date of Patent: Aug. 23, 2022

(54) FAILURE DIAGNOSIS SYSTEM

(71) Applicant: SUMITOMO HEAVY INDUSTRIES, LTD., Tokyo (JP)

(72) Inventors: Kota Suzuki, Aichi (JP); Mikio Komatsu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 156 days.

(21) Appl. No.: 16/415,663

(22) Filed: May 17, 2019

(65) Prior Publication Data

US 2019/0271974 A1 Sep. 5, 2019

Related U.S. Application Data

(63) Continuation of application No. PCT/JP2017/041895, filed on Nov. 21, 2017.

(30) Foreign Application Priority Data

Dec. 1, 2016 (JP) .............................. JP2016-234076

(51) Int. Cl.
  *G05B 23/02* (2006.01)
  *B60W 50/02* (2012.01)
  *G07C 5/08* (2006.01)

(52) U.S. Cl.
  CPC ......... *G05B 23/02* (2013.01); *B60W 50/0205* (2013.01); *G07C 5/0808* (2013.01)

(58) Field of Classification Search
  CPC ................ G05B 23/02; G05B 19/042; G05B 2219/37434; G05B 2219/2637; B60W 50/0205; G07C 5/0808
  See application file for complete search history.

(56) References Cited

U.S. PATENT DOCUMENTS

| | | |
|---|---|---|
| 5,176,027 A | 1/1993 | Umemoto |
| 5,548,597 A | 8/1996 | Kayama et al. |
| 7,881,837 B2 | 2/2011 | Misawa |

(Continued)

FOREIGN PATENT DOCUMENTS

| | | |
|---|---|---|
| CN | 1112249 A | 11/1995 |
| CN | 1503391 A | 6/2004 |

(Continued)

OTHER PUBLICATIONS

International Search Report issued in Application No. PCT/JP2017/041895, dated Jan. 16, 2018.

(Continued)

*Primary Examiner* — Michael V Kerrigan
(74) *Attorney, Agent, or Firm* — Michael Best & Friedrich LLP

(57) ABSTRACT

A failure diagnosis system includes a sensor that is provided in each of a plurality of diagnosis target devices and detects diagnosis target information of a corresponding diagnosis target device and a processing unit that is provided with respect to one or the plurality of diagnosis target devices and processes the diagnosis target information detected by the sensor. The processing unit is capable of executing a first processing mode and a second processing mode in which processing different from the first processing mode is performed, and processes the diagnosis target information in a selected processing mode.

20 Claims, 5 Drawing Sheets

(56) References Cited

U.S. PATENT DOCUMENTS

| | | | |
|---|---|---|---|
| 8,036,847 B2 | 10/2011 | Discenzo | |
| 9,020,692 B2 | 4/2015 | Amano et al. | |
| 2003/0048085 A1 | 3/2003 | Susono et al. | |
| 2003/0149523 A1 | 8/2003 | Oosawa | |
| 2006/0184027 A1 | 8/2006 | Watanabe et al. | |
| 2007/0276559 A1 | 11/2007 | Misawa et al. | |
| 2010/0076714 A1* | 3/2010 | Discenzo | H02N 2/185 702/104 |
| 2010/0305806 A1* | 12/2010 | Hawley | G07C 5/008 701/31.4 |
| 2014/0288675 A1 | 9/2014 | Fujiwara et al. | |
| 2016/0123840 A1 | 5/2016 | Takada et al. | |

FOREIGN PATENT DOCUMENTS

| | | |
|---|---|---|
| CN | 105322802 A | 2/2006 |
| CN | 102073318 A | 5/2011 |
| CN | 102736615 A | 10/2012 |
| CN | 102959379 A | 3/2013 |
| CN | 203012501 U | 6/2013 |
| CN | 103328269 A | 9/2013 |
| CN | 103543698 A | 1/2014 |
| CN | 103614335 A | 5/2014 |
| CN | 104333593 A | 2/2015 |
| CN | 105209995 A | 12/2015 |
| CN | 105302112 A | 2/2016 |
| CN | 105988454 A | 10/2016 |
| CN | 106030426 A | 10/2016 |
| DE | 10 2006 024376 A1 | 11/2007 |
| DE | 11 2004 002 834 34 | 12/2012 |
| FR | 2825166 A1 | 11/2002 |
| JP | H03-210052 A | 9/1991 |
| JP | H07-110708 A | 4/1995 |
| JP | H09-305216 A | 11/1997 |
| JP | H09-329529 A | 12/1997 |
| JP | H11-095833 A | 4/1999 |
| JP | H11-316177 A | 11/1999 |
| JP | 2003-088178 A | 3/2003 |
| JP | 2005-009924 A | 1/2005 |
| JP | 2013-024617 A | 2/2013 |
| JP | 2013-199804 A | 10/2013 |
| JP | 2013-210945 A | 10/2013 |
| JP | 2014-186631 A | 10/2014 |
| JP | 2017-151923 A | 8/2017 |
| WO | 2011-121726 A1 | 10/2011 |
| WO | WO-2013/088914 A1 | 6/2013 |

OTHER PUBLICATIONS

Office Action issued in Japanese Application No. 2016-234076, dated Jul. 14, 2020.
Office Action issued in Chinese Application No. 201780060209.9, dated Aug. 25, 2021.
Office Action issued in Japanese Application No. 2016-234076, dated Jun. 29, 2021.
Office Action issued in Chinese Application No. 201780060209.9, dated Mar. 14, 2022.
Office Action issued in German Application No. 11 2017 006 122.9, dated Mar. 23, 2022.

* cited by examiner

FIG. 3

| SENSOR TYPE | EFFECTIVE SAMPLING FREQUENCY |
|---|---|
| AAA | 1.0 TO 25.6 |
| BBB | 1.0 TO 51.2 |

FIG. 4

| CONNECTED SENSOR NUMBER | 3 | | | |
|---|---|---|---|---|
| PORT 1 | PORT 2 | PORT 3 | PORT 4 | PORT 5 | PORT 6 | PORT 7 | PORT 8 | PORT 9 | PORT 10 | PORT 11 | PORT 12 |

| ITEM | SET VALUE | UNIT | SETTING RANGE | |
|---|---|---|---|---|
| | | | LOWER THRESHOLD | UPPER THRESHOLD |
| SENSOR TYPE | AAA | - | - | - |
| PROCESSING MODE | ●FIRST PROCESSING MODE ○SECOND PROCESSING MODE | - | - | - |
| SAMPLING FREQUENCY | 3.2 | kHz | 1.0 | 25.6 |
| MEASURED TIME | 10.0 | sec | 5.0 | 60.0 |
| DIAGNOSIS PROCESSING INTERVAL | 60.0 | min | 5.0 | 1440 |
| ... | ... | ... | ... | ... |

FAILURE DIAGNOSIS SYSTEM

RELATED APPLICATIONS

The contents of Japanese Patent Application No. 2016-234076, filed Dec. 1, 2016, and of International Patent Application No. PCT/JP2017/041895, on the basis of each of which priority benefits are claimed in an accompanying application data sheet, are in their entirety incorporated herein by reference.

BACKGROUND

Technical Field

A certain embodiment of the present invention relates to a failure diagnosis system.

Description of Related Art

A failure diagnosis system for detecting a failure of a device, for example, a motor, a gear motor, a gear box, and the like is known. In general, the failure diagnosis system includes a sensor disposed in a diagnosis target device and a processing unit that determines whether or not an abnormality has occurred in the diagnosis target device based on information from the sensor. For example, a failure diagnosis system described in the related art is disclosed as the related art.

SUMMARY

According to an aspect of the present invention, there is provided a failure diagnosis system including a sensor that is provided in each of a plurality of diagnosis target devices and detects diagnosis target information of a corresponding diagnosis target device and a processing unit that is provided with respect to one or the plurality of diagnosis target devices and processes the diagnosis target information detected by the sensor. The processing unit is capable of executing a first processing mode and a second processing mode in which processing different from the first processing mode is performed, and processes the diagnosis target information in a selected processing mode.

BRIEF DESCRIPTION OF THE DRAWINGS

FIG. 3 is a data structure diagram of a sensor information holding unit of FIG. 2.

FIG. 4 is a view illustrating an input screen of diagnosis setting information.

DETAILED DESCRIPTION

It is desirable to provide a highly convenient failure diagnosis system.

Any combination of the configuration elements described above, or an embodiment, in which a configuration element or description of the present invention is switched between methods, devices, and systems, is also effective as an aspect of the present invention.

According to the present invention, the highly convenient failure diagnosis system can be provided.

Hereinafter, the same or equivalent configuration elements, members, and processes, which are illustrated in each drawing, will be assigned with the same reference signs, and overlapping description will be omitted as appropriate. The dimension of a member in each drawing is enlarged or reduced as appropriate in order to facilitate understanding. In addition, some of members that are not important in describing an embodiment will be omitted in each drawing.

Figure 1:
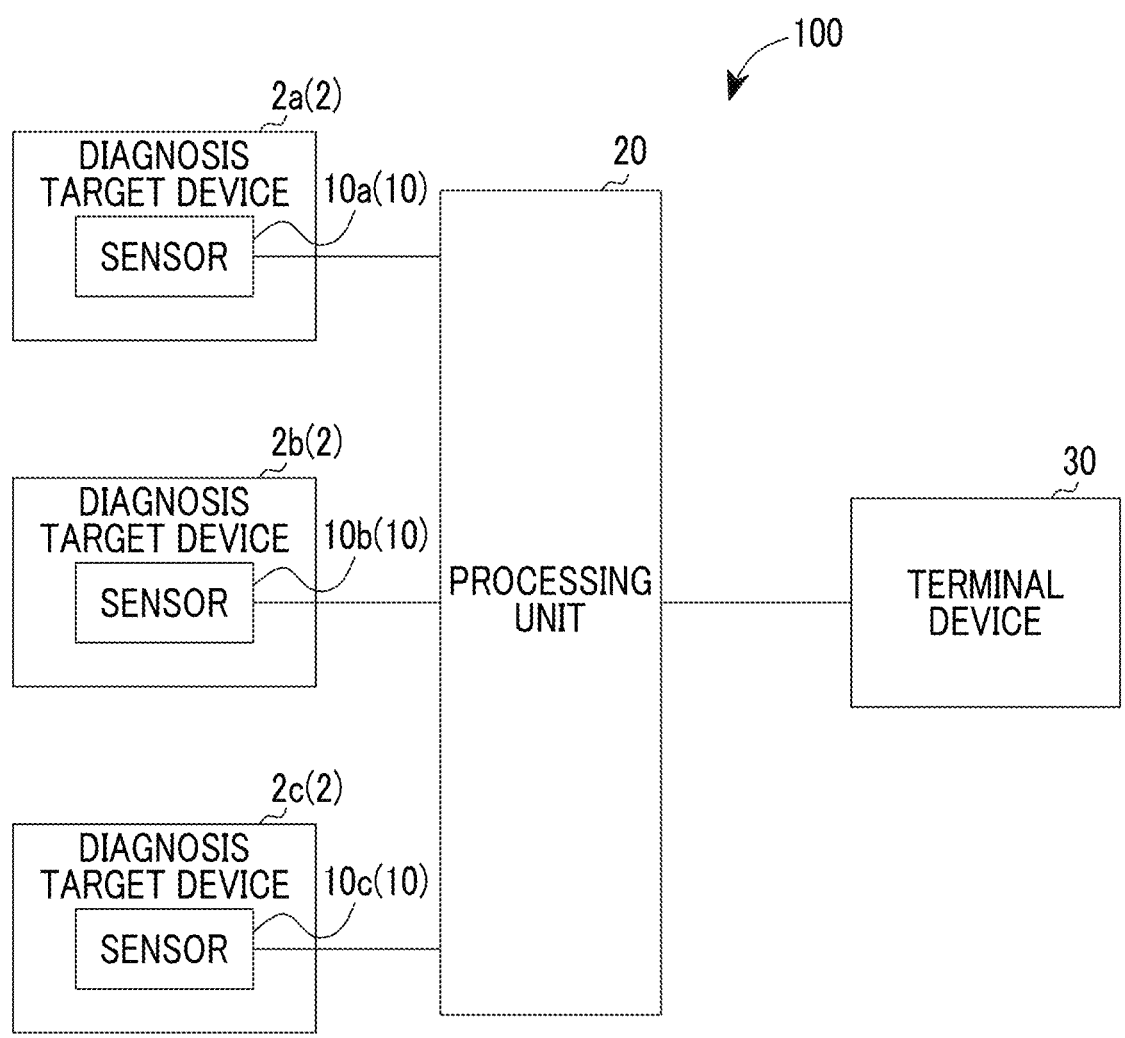
FIG. 1 is a schematic diagram showing a failure diagnosis system according to an embodiment.

FIG. 1 is a schematic diagram showing a failure diagnosis system 100 according to the embodiment. The failure diagnosis system 100 detects abnormalities of gear motors 2$a$, 2$b$, and 2$c$, which are collectively referred to as a gear motor 2, and supports analysis thereof. The failure diagnosis system 100 may be used in detecting an abnormality of a diagnosis target device other than the gear motor 2, for example, a motor, a gear box, an engine, a machine tool, a molding machine, and the like.

The failure diagnosis system 100 includes sensors 10$a$, 10$b$, and 10$c$, which are collectively referred to as a sensor 10, a processing unit 20, and a terminal device 30. In the embodiment, each of the sensors 10$a$, 10$b$, and 10$c$ is connected to the processing unit 20 in a wired manner. In addition, the processing unit 20 is connected to the terminal device 30 in a wired or wireless manner. Although a case where three sensors 10 are connected to the processing unit 20 is shown in FIG. 1, the number of the sensors 10 connected to the processing unit 20 is not limited insofar as the number of sensors is within the number of sensor connecting ports of the processing unit 20. Therefore, for example, only one sensor 10 may be connected to the processing unit 20.

The sensors 10$a$, 10$b$, and 10$c$ are attached to the gear motors 2$a$, 2$b$, and 2$c$ respectively. The sensor 10 is a vibration sensor in the embodiment, detects vibration occurred in the corresponding gear motor 2, and generates vibration information (diagnosis target information) indicating the level of vibration to transmit to the processing unit 20. Although a case where one sensor 10 is attached to each gear motor 2 is shown in FIG. 1, two or more sensors 10 may be attached to each gear motor 2. It is evident that two or more sensors 10 may be attached to a part of the gear motor 2. In addition, a position where the sensor 10 is attached to the gear motor 2 may be determined by experiments or simulations of a position suitable for abnormality detection.

The processing unit 20 executes predetermined processing with respect to vibration information transmitted from each sensor 10. In the embodiment, the processing unit 20 repeatedly executes diagnosis processing of determining whether or not an abnormality has occurred in the gear motors 2$a$, 2$b$, and 2$c$ based on the vibration information transmitted from the sensors 10$a$, 10$b$, and 10$c$. Then, the processing unit 20 transmits a determination result to the terminal device 30.

The terminal device 30 is an information processing device operated by a user. The terminal device 30 causes an input screen (to be described later in FIG. 4) for inputting setting information (hereinafter, referred to as "diagnosis setting information") related to diagnosis processing of determining whether or not an abnormality has occurred in the gear motor 2 to be displayed. The terminal device 30 uploads the diagnosis setting information, which is input to the input screen, to the processing unit 20. In addition, the terminal device 30 causes a predetermined display unit to display a determination result of diagnosis processing transmitted from the processing unit 20. A user can learn that an abnormality has occurred in the gear motor 2 by checking the determination result displayed by the display unit.

Figure 2:
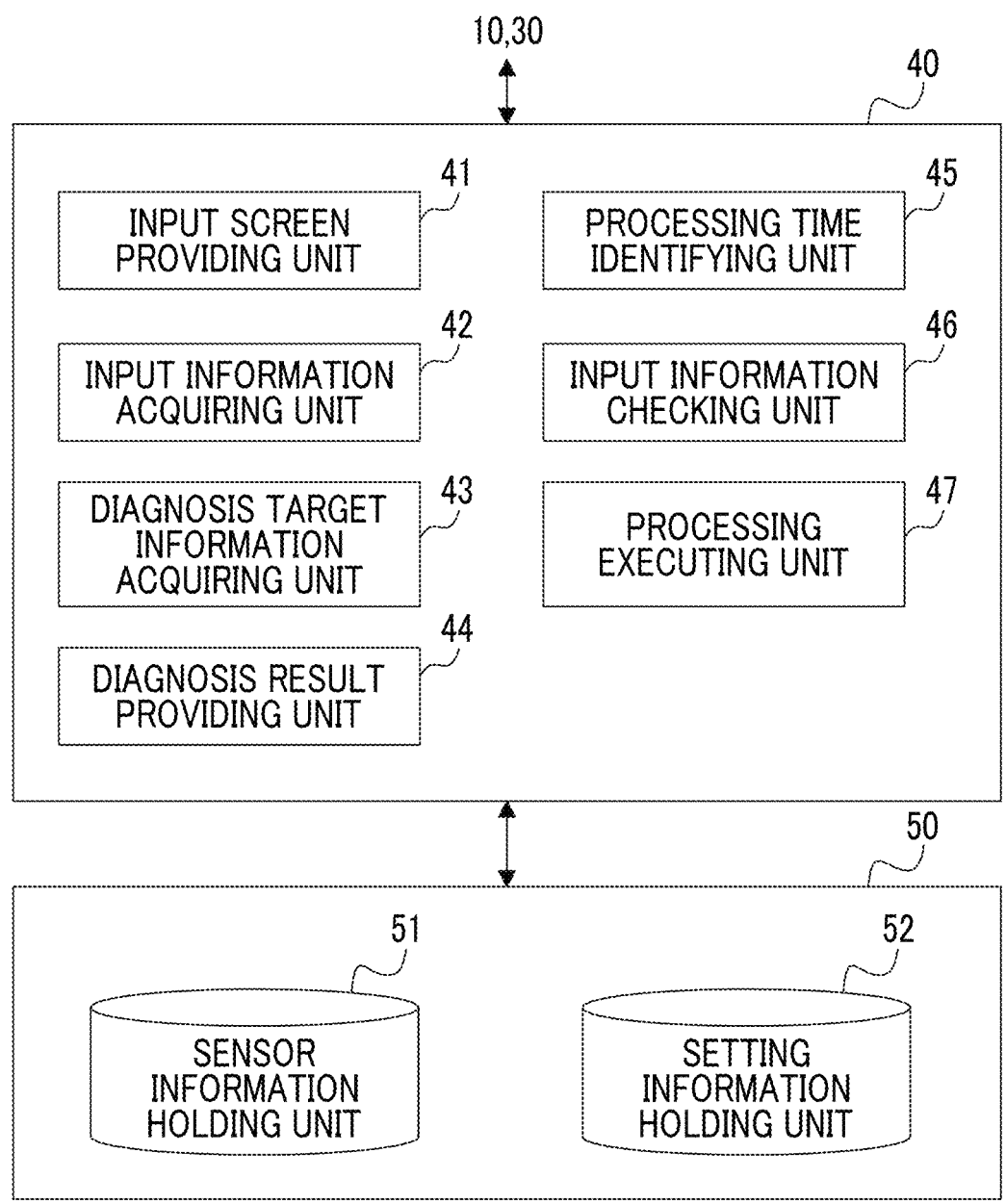
FIG. 2 is a block diagram showing a function and a configuration of a processing unit of FIG. 1.

FIG. 2 is a block diagram showing a function and a configuration of the processing unit 20. Each block shown herein can be realized by an element or a mechanical device such as a CPU or a memory of a computer in terms of hardware, and is realized by a computer program in terms of software. However, functional blocks realized in cooperation with hardware and software are shown herein. Therefore, it is clear for those skilled in the art that the functional blocks can be realized in a variety of manners in combination of hardware and software. The same applies to the following block diagrams.

The processing unit 20 includes a data processing unit 40 that executes diagnosis processing and a data holding unit 50 that is a storage region where various types of data for the data processing are stored.

The data holding unit 50 includes a sensor information holding unit 51 and a setting information holding unit 52. The sensor information holding unit 51 holds information related to a sensor. FIG. 3 is a data structure diagram of the sensor information holding unit 51. The sensor information holding unit 51 correlates a sensor type with an effective sampling frequency and holds the correlation. The sensor type means a type of a sensor, and the effective sampling frequency means a range of an effective sampling frequency with respect to the sensor. The more responsive a type of a sensor is, the higher an upper threshold of an effective sampling frequency becomes. For example, information related to a sensor which is connected to or has a possibility of being connected to the processing unit 20 may be registered in the sensor information holding unit 51.

The setting information holding unit 52 holds diagnosis setting information. The diagnosis setting information is various types of setting information input to the input screen of FIG. 4, which is to be described later, and includes, for example, a processing mode, a sampling frequency, and the like.

The data processing unit 40 includes an input screen providing unit 41, an input information acquiring unit 42, a diagnosis target information acquiring unit 43, a diagnosis result providing unit 44, a processing time identifying unit 45, an input information checking unit 46, and a processing executing unit 47.

The input screen providing unit 41 receives an access from the terminal device 30, and transmits an input screen of diagnosis setting information to cause the terminal device 30 to display the input screen. FIG. 4 illustrates the input screen of the diagnosis setting information. Every time setting information is input to each field of the input screen, the content thereof is uploaded from the terminal device 30 to the processing unit 20 in the embodiment.

The number of the sensors 10 connected to the processing unit 20 is input into a connected sensor number field 61. Since the processing unit 20 of the embodiment includes twelve sensor connecting ports for connecting the sensor 10, a value of one to twelve can be set in the connected sensor number field 61. When a tab 62 (a port 1 to a port 12) is clicked, the input screen is switched to an input screen of diagnosis setting information related to the sensor 10 connected to a corresponding sensor connecting port. That is, diagnosis setting information such as a processing mode can be set for each connected sensor 10 in the embodiment. Only a sensor connecting port to which the sensor 10 is actually connected can be selected through the tab 62.

In a sensor type field 63, a sensor type of the corresponding sensor 10 is selected from sensor types held by the sensor information holding unit 51. For example, in a case where data held by the sensor information holding unit 51 is in a state of FIG. 3, a sensor type "AAA" or a sensor type "BBB" can be selected in the sensor type field 63.

A processing mode indicating processing executed with respect to vibration information acquired from the corresponding sensor 10 is selected in a processing mode field 64. In the embodiment, a first processing mode or a second processing mode can be selected as a processing mode. The first processing mode and the second processing mode will be described later.

A frequency that the diagnosis target information acquiring unit 43 acquires vibration information transmitted from the sensor 10 is input to a sampling frequency field 65. Time for which the diagnosis target information acquiring unit 43 acquires vibration information transmitted from the sensor 10 through one time of diagnosis processing is set in a measured time field 66. In other words, for how long vibration information is to be used in one time of diagnosis is set in the measured time field 66. An interval at which diagnosis processing is executed is set in a diagnosis processing interval field 67.

A range of a value that can be set is displayed in each field of the sampling frequency, the measured time, and the diagnosis processing interval. When a sensor type is selected, the input screen providing unit 41 renews an input screen on which an effective sampling frequency of the sensor type is set as a sampling frequency setting range. Since "AAA" is selected in the sensor type as information related to the sensor 10 connected to the port 1 in FIG. 4, an effective sampling frequency of "1.0 to 25.6" (refer to FIG. 3) of a sensor of the sensor type "AAA" is set as a setting range in the sampling frequency field 65. In addition, when a processing mode, a sampling frequency, and measured time are input, the input screen providing unit 41 renews an input screen on which diagnosis processing time (to be described later) identified by the processing time identifying unit 45 as will be described later is set as a lower threshold of a diagnosis processing interval. In addition, when the sampling frequency increases, an acquired data amount of vibration information increases, thereby squeezing the data into a storage of the processing unit 20 or the like. Therefore, the input screen providing unit 41 may renew an input screen such that an upper threshold of measured time decreases as an input sampling frequency increases.

Referring back to FIG. 2, the input information acquiring unit 42 acquires diagnosis setting information uploaded from the terminal device 30, and registers the diagnosis setting information in the setting information holding unit 52.

In a case where diagnosis processing related to all of the sensors 10 connected to the processing unit 20 has simultaneously started, the processing time identifying unit 45 identifies time required for diagnosis processing of all of the sensors to be terminated (hereinafter, referred to as "diagnosis processing time"). The diagnosis processing time includes "reading time" for which the diagnosis target information acquiring unit 43 reads vibration information acquired from each sensor 10, that is, loads the vibration information to a storage or a memory and "determining time" for which whether or not an abnormality has occurred in the corresponding gear motor 2 is determined based on the read vibration information from each sensor 10. Therefore, the processing time identifying unit 45 identifies time which is obtained by adding the reading time and the diagnosing time together as diagnosis processing time.

The reading time is determined by a data amount of the read vibration information. Therefore, with reference to the setting information holding unit 52, the processing time identifying unit 45 identifies reading time based on a sampling frequency and measured time, which are diagnosis setting information having an effect on a data amount of vibration information. Since the number of CPUs (or cores) and a processing performance of the processing unit 20 and a performance of a storage or a memory have an effect on reading time, a formula for identifying reading time may be determined through experiments or the like.

The determining time is determined by a data amount of vibration information to be used in determination and a method of determining whether or not an abnormality has occurred, that is, processing content executed with respect to vibration information. Therefore, with reference to the setting information holding unit 52, the processing time identifying unit 45 identifies determining time based on a sampling frequency, measured time, and a processing mode. Since the number of CPUs (or cores) and a processing performance of the processing unit 20 and a performance of a storage or a memory have an effect on determining time, a formula for identifying determining time may be determined through experiments or the like.

The input information checking unit 46 checks whether or not the input diagnosis setting information is a value within a setting range. In the embodiment, when there is diagnosis setting information deviated from the setting range, the input information checking unit 46 automatically corrects the diagnosis setting information. Specifically, in a case where the input diagnosis setting information is smaller than a lower threshold, the input information checking unit 46 automatically corrects the diagnosis setting information to be the lower threshold. In a case where the input diagnosis setting information is larger than an upper threshold, the input information checking unit automatically corrects the diagnosis setting information to be the upper threshold. For example, in a case where a value set as a diagnosis processing interval is the lower threshold that can be set as the diagnosis processing interval and is smaller than the diagnosis processing time identified by the processing time identifying unit 45, the input information checking unit 46 corrects diagnosis processing time to be the diagnosis processing interval. The input screen providing unit 41 may renew an input screen displayed on the terminal device 30 to an input screen to which an automatically corrected value is input.

The diagnosis target information acquiring unit 43 acquires set measured time and vibration information at a set sampling frequency for each diagnosis processing interval from each sensor 10. For example, in a case where diagnosis setting information related to the sensor 10 connected to the port 1 is in a state of FIG. 4, the diagnosis target information acquiring unit 43 acquires vibration information from the sensor 10 once in 60 minutes for 10.0 seconds with a frequency of a sampling frequency of 3.2 kHz.

The processing executing unit 47 executes processing according to a set processing mode with respect to vibration information acquired from each sensor 10.

In the embodiment, in a case where the first processing mode is set, the processing executing unit 47 executes simplified diagnosis with respect to vibration information. In a case where the second processing mode is set, the processing executing unit executes thorough diagnosis with respect to vibration information. Herein, the thorough diagnosis is more highly sophisticated processing than the simplified diagnosis, and refers to processing that requires longer time from a processing start to a processing end than the simplified diagnosis does when the same amount of vibration information is processed.

For example, the simplified diagnosis is diagnosis of determining that an abnormality has occurred in a case where the level of a peak value of vibration indicated by vibration information exceeds a predetermined threshold (hereinafter, also referred to as "peak value diagnosis"), and is diagnosis of determining that an abnormality has occurred in a where the level of an effective value of vibration indicated by vibration information exceeds a predetermined threshold (hereinafter, also referred to as "effective value diagnosis").

For example, the thorough diagnosis is diagnosis of determining that an abnormality has occurred in a case where a fast Fourier transform (FFT) is executed with respect to a vibration waveform based on vibration information and, out of vibration components of each frequency obtained as a result, a certain frequency or a vibration component of a frequency in a certain range exceeds a predetermined threshold (hereinafter, also referred to as "FFT diagnosis"). In addition, for example, the thorough diagnosis is diagnosis of determining that an abnormality has occurred in a case where an FFT is executed with respect to an envelope of a vibration waveform based on vibration information and, out of vibration components of each frequency obtained as a result, a certain frequency or a vibration component of a frequency in a certain range exceeds a predetermined threshold (hereinafter, also referred to as "H-FFT diagnosis").

The diagnosis result providing unit 44 transmits a diagnosis result screen showing a determination result of diagnosis processing to cause the terminal device 30 to display the diagnosis result screen. Only in a case where it is determined that an abnormality has occurred, the diagnosis result providing unit 44 transmits a diagnosis result screen showing a determination result to cause the terminal device 30 to display the diagnosis result screen.

Operation of the failure diagnosis system 100 configured as described above will be described. The processing unit 20 acquires diagnosis setting information input to an input screen. In a case where a value out of a range that can be set is input, the processing unit 20 automatically corrects diagnosis setting information. When a predetermined start command is received, the processing unit 20 acquires set measured time and vibration information at a set sampling frequency for each diagnosis processing interval set as diagnosis setting information from each sensor 10. The processing unit 20 executes diagnosis processing based the acquired vibration information. Specifically, the processing unit 20 executes diagnosis processing in the first processing mode with respect to vibration information transmitted from the sensor 10 in which the first processing mode is set, and executes diagnosis processing in the second processing mode with respect to vibration information transmitted from the sensor 10 in which the second processing mode is set. Then, the processing unit 20 transmits a diagnosis result screen to cause the terminal device 30 to display the diagnosis result screen. A user checks the diagnosis result screen, and learns whether or not an abnormality has occurred in the gear motor 2.

In the failure diagnosis system 100 according to the embodiment described hereinbefore, processing to be executed with respect to vibration information acquired from the sensor 10 can be selected from the first processing mode in which the simplified diagnosis is executed and the second processing mode in which the thorough diagnosis is executed.

Herein, for example, in a case where low diagnosis accuracy is acceptable, that is, a case where it is sufficient to detect a terminal-level failure, the sensor 10 having a relatively low response frequency can be used, and relatively simple processing is enough as diagnosis content. In addition, for example, in a case where high diagnosis accuracy is required, that is, a case where identification of a failed part or detection of a sign of a failure is required, it is necessary to use the sensor 10 having a relatively high response frequency, and more highly sophisticated processing is necessary as diagnosis content.

On the other hand, in the failure diagnosis system 100 according to the embodiment, processing executed with respect to vibration information can be selected from the first processing mode and the second processing mode as described above, that is, a change can be easily made to have diagnosis accuracy according to a diagnosis target, a diagnosis object, or the like. Thus, user convenience improves.

In addition, in the failure diagnosis system 100 according to the embodiment, diagnosis processing time can be identified based on diagnosis setting information input by a user. The identified diagnosing time is displayed onto an input screen as a minimum value of a setting range of a processing interval. For example, even in a case where a processing mode executed with respect to vibration information is changed and accordingly diagnosis processing time has changed, diagnosis processing time is identified and displayed onto an input screen. Therefore, since it is not necessary to calculate a range of a processing interval that can be set by a user, a burden on the user reduces.

In addition, in the failure diagnosis system 100 according to the embodiment, in a case where a value out of the range that can be set is input as diagnosis setting information, the value is automatically corrected. For example, in a case where diagnosis setting information input as a processing interval is smaller than the lower threshold, the lower threshold is set as diagnosis setting information. Accordingly, it is possible to prevent diagnosis from being executed in a state where setting is not effective. In addition, since it is not necessary for a user to correct setting information, a burden on the user reduces.

The failure diagnosis system according to the embodiment is described hereinbefore. The embodiments are merely an example. It is clear for those skilled in the art that a variety of modification examples can be made in combination of respective configuration elements or respective processes, and such modification examples also fall within the scope of the present invention. The modification examples will be described as follows.

Modification Example 1

Although it is described in the embodiment that in a case where the first processing mode is selected, the processing executing unit 47 executes the simplified diagnosis with respect to vibration information, and in a case where the second processing mode is selected, the processing executing unit executes the thorough diagnosis with respect to vibration information, the invention is not limited thereto.

For example, in a case where the first processing mode is selected, the processing executing unit 47 may output (transmit) vibration information to an external device of the processing unit 20 (for example, the terminal device 30), and in a case where the second processing mode is selected, the processing executing unit may execute the simplified diagnosis and/or the thorough diagnosis.

For example, it may be configured that a desired processing mode can be selected from three or more processing modes.

For example, the input screen of FIG. 4 may be configured such that any one of the first processing mode, the second processing mode, and a third processing mode can be selected in the processing mode field 64. For example, in a case where the first processing mode is selected, the processing executing unit 47 may output vibration information to an external device of the processing unit 20. In a case where the second processing mode is selected, the processing executing unit may execute the simplified diagnosis. In a case where the third processing mode is selected, the processing executing unit may execute the thorough diagnosis.

For example, the input screen of FIG. 4 may be configured such that any one of the first processing mode, the second processing mode, the third processing mode, and a fourth processing mode can be selected in the processing mode field 64. For example, in a case where the first processing mode is selected, the processing executing unit 47 may execute the peak value diagnosis. In a case where the second processing mode is selected, the processing executing unit may execute the effective value diagnosis. In a case where the third processing mode is selected, the processing executing unit may execute the FFT diagnosis. In a case where the fourth processing mode is selected, the processing executing unit may execute the H-FFT diagnosis. In addition, it may be configured that a plurality of processing modes can be selected.

Modification Example 2

Figure 5:
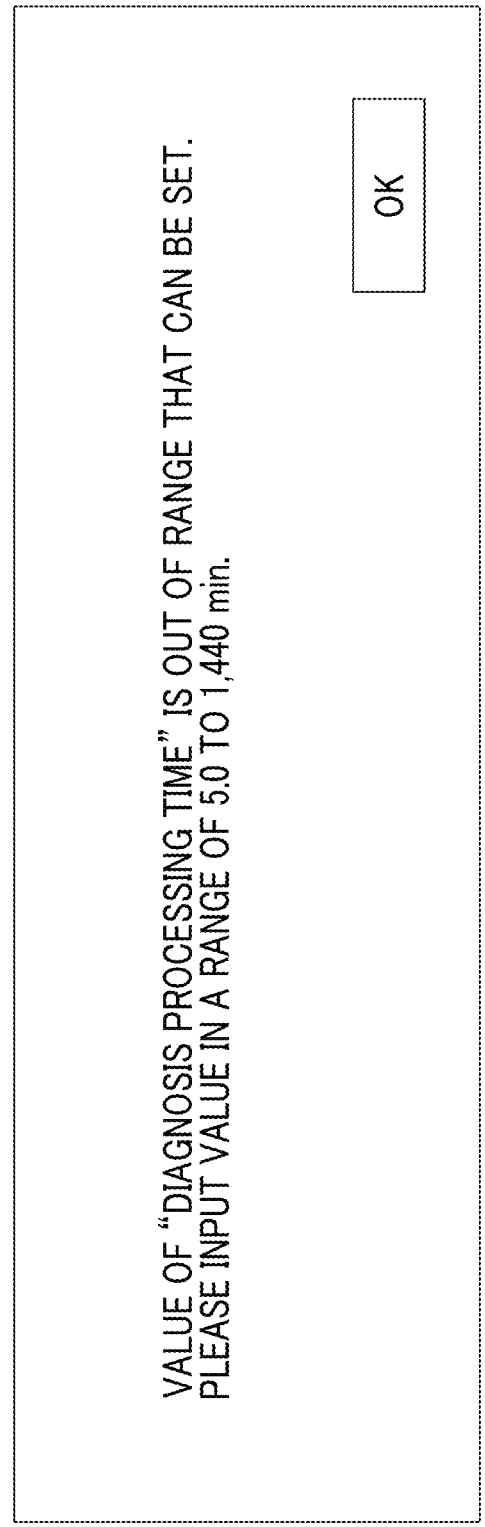
FIG. 5 is a view illustrating a notification screen.

Although a case where the input information checking unit 46 sets diagnosis processing time as a diagnosis processing interval when a diagnosis processing interval input to the input screen is shorter than diagnosis processing time identified by the processing time identifying unit 45 is described in the embodiment, without being limited thereto, for example, a notification suggesting a change of a diagnosis processing interval and/or a change of the number of the connected sensors 10 may be made. For example, the input information checking unit 46 may make a notification by transmitting a notification screen illustrated in FIG. 5 to cause the terminal device 30 to display the notification screen. Although content suggesting a change of diagnosing time is displayed in FIG. 5, content suggesting a change of the number of sensors may be displayed in addition to a change of diagnosing time or instead of a change of diagnosing time.

Modification Example 3

Although a case where a user inputs a processing mode and a sampling frequency to an input screen is described in the embodiment, the invention is not limited thereto.

For example, a processing mode may be automatically set according to the type of the sensor 10 to be connected. In this case, the sensor information holding unit 51 may correlate a sensor type with a processing mode and hold the correlation. For example, the first processing mode in which the simplified diagnosis is executed may be correlated with a sensor having relatively low responsiveness, and the second processing mode in which the thorough diagnosis is executed may be correlated with a sensor having relatively high responsiveness. With reference to the sensor information holding unit 51, the input information checking unit 46 may automatically set a processing mode corresponding to a sensor type input in the sensor type field 63 on an input screen.

For example, a sampling frequency may be automatically set according to the type of the sensor 10 to be connected. In this case, the sensor information holding unit 51 may correlate a sensor type with a sampling frequency and hold the correlation. For example, a relatively low sampling frequency may be correlated with a sensor having relatively low responsiveness, and a relatively high sampling frequency may be correlated with a sensor having relatively high responsiveness. With reference to the sensor information holding unit 51, the input information checking unit 46 may automatically set a sampling frequency corresponding to a sensor type input in the sensor type field 63 on an input screen.

Modification Example 4

The terminal device 30 may have some functions of the processing unit 20. For example, instead of the processing unit 20, the terminal device 30 may include the input screen providing unit 41, the processing time identifying unit 45, the input information checking unit 46, and the sensor information holding unit 51.

Modification Example 5

Although a case where whether or not an abnormality has occurred in the gear motor 2 is determined based on vibration occurred in the gear motor 2 is described in the embodiment, the failure diagnosis system 100 is not limited thereto. For example, the failure diagnosis system 100 may diagnose whether or not an abnormality has occurred in the gear motor 2 based on at least one of a motor current, a temperature, and iron powder concentration of a lubricant of the gear motor 2, instead of vibration occurred in the gear motor 2 or in addition to vibration occurred in the gear motor 2. That is, instead of vibration information or in addition to vibration information, at least one piece of information related to a motor current, a temperature, or iron powder concentration of a lubricant may be diagnosis target information. The same also applies to a case of a diagnosis target device other than the gear motor 2. That is, the failure diagnosis system 100 may use diagnosis target information suitable for determining an abnormality of a diagnosis target device.

Modification Example 6

Although a case where one terminal device 30 is provided with respect to one processing unit 20 is described in the embodiment, one terminal device 30 may be provided with respect to a plurality of processing units 20.

Any combination of the embodiment and the modification examples described above can be used as an embodiment of the present invention as well. A new embodiment made by combination has an effect of each of the embodiment and the modification examples that are combined.

The embodiment of the present invention can be used as a failure diagnosis system.

It should be understood that the invention is not limited to the above-described embodiment, but may be modified into various forms on the basis of the spirit of the invention. Additionally, the modifications are included in the scope of the invention.

What is claimed is:

1. A failure diagnosis system comprising:
   a processing unit that is electrically connected to a sensor; and
   a terminal device that is electrically connected to the processing unit,
   wherein the terminal device is configured to:
      receive, as an input from a user, a processing mode,
   wherein the sensor is configured to:
      detect diagnosis target information of a diagnosis target device, and
   wherein the processing unit is configured to:
      output, when the processing mode is a first processing mode, the diagnosis target information to an external device without the processing unit determining whether or not an abnormality has occurred in the diagnosis target device.

2. The failure diagnosis system according to claim 1, wherein the external device is the terminal device.

3. The failure diagnosis system according to claim 1, wherein the diagnosis target device comprises the sensor.

4. The failure diagnosis system according to claim 1, wherein the processing unit is configured to:
   process, when the processing mode is a second processing mode, the diagnosis target information in a manner that causes the processing unit to determine whether or not the abnormality has occurred in the diagnosis target device.

5. The failure diagnosis system according to claim 1, wherein the processing unit is configured to:
   perform FFT diagnosis which is diagnosis of determining that an abnormality has occurred in a case where a fast Fourier transform (FFT) is executed with respect to a waveform of the diagnosis target information and, out of components of each frequency obtained as a result, a component of a certain frequency or a frequency in a certain range exceeds a predetermined threshold.

6. The failure diagnosis system according to claim 1, wherein the processing unit is configured to:
   perform hexagonal fast Fourier transform (H-FFT) diagnosis which is diagnosis of determining that an abnormality has occurred in a case where a fast Fourier transform (FFT) is executed with respect to an envelope of a waveform of the diagnosis target information and, out of components of each frequency obtained as a result, a component of a certain frequency or a frequency in a certain range exceeds a predetermined threshold.

7. The failure diagnosis system according to claim 1, wherein the processing unit is configured to:
   perform peak value diagnosis which is diagnosis of determining that an abnormality has occurred in a case where a level of a peak value of the diagnosis target information exceeds a predetermined threshold.

8. The failure diagnosis system according to claim 1, wherein the processing unit is configured to:
   perform effective value diagnosis which is diagnosis of determining that an abnormality has occurred in a case where a level of an effective value of the diagnosis target information exceeds a predetermined threshold.

9. The failure diagnosis system according to claim 1, wherein the processing unit is electrically connected to a plurality of sensors, the sensor is one of the sensors.

10. The failure diagnosis system according to claim 9, wherein the processing unit or the terminal device is configured to:
   obtain, based on an amount of data acquired from each of the sensors, a processing time required for processing the data from all of the sensors.

11. The failure diagnosis system according to claim 10, wherein the processing unit or the terminal device is configured to:
   set, when a diagnosis processing interval is shorter than the processing time, a notification suggesting a change of the processing interval and/or a change of the number of the connected sensors is made.

12. The failure diagnosis system according to claim 10, wherein the processing unit or the terminal device is configured to:
   set, when a diagnosis processing interval is shorter than the processing time, the processing time as the diagnosis processing interval.

13. The failure diagnosis system according to claim 9, wherein the processing unit is provided with respect to the plurality of the sensors, and processes the diagnosis target information detected by the plurality of the sensors, and
   wherein the terminal device receives, from the user, a selection of which mode between the first processing mode and the second processing mode is performed for each of the plurality of the sensors.

14. The failure diagnosis system according to claim 1, wherein the terminal device is configured to:
   receive a measured time from the user.

15. The failure diagnosis system according to claim 14, wherein the processing unit is configured is configured to:
   detect, for the measured time at a sampling frequency, the diagnosis target information.

16. The failure diagnosis system according to claim 15, wherein the sampling frequency is a frequency at which the processing unit acquires the diagnosis target information from the sensor.

17. The failure diagnosis system according to claim 15, wherein the measured time is a time duration for which the sensor acquires the diagnosis target information used for one time of diagnosis processing.

18. The failure diagnosis system according to claim 14, further comprising:
   an input screen comprising a graphic user interface, the graphic user interface is configured to:
      display, on the input screen, the sampling frequency and the measured time.

19. The failure diagnosis system according to claim 18, wherein the input screen is configured to:
   receive, from the terminal device, the sampling frequency and the measured time.

20. The failure diagnosis system according to claim 1, wherein the terminal device receives a type of the sensor from the user and presents to the user a range of a sampling frequency that is capable of being set for the type of the sensor received from the user.

* * * * *